United States Patent [19]

Lindberg

[11] Patent Number: 5,519,269
[45] Date of Patent: May 21, 1996

[54] ELECTRIC INDUCTION MOTOR AND RELATED METHOD OF COOLING

[75] Inventor: Frank A. Lindberg, Baltimore, Md.

[73] Assignee: Westinghouse Electric Corp., Pittsburgh, Pa.

[21] Appl. No.: 442,708

[22] Filed: May 18, 1995

Related U.S. Application Data

[63] Continuation of Ser. No. 258,150, Jun. 10, 1994, abandoned.

[51] Int. Cl.⁶ .................................................. H02K 9/193
[52] U.S. Cl. ............... 310/58; 310/59; 310/60 A
[58] Field of Search ................. 310/58, 59, 61, 310/62, 63, 60 A

[56] References Cited

U.S. PATENT DOCUMENTS

| | | | |
|---|---|---|---|
| 3,531,668 | 2/1969 | Cathey | 310/58 |
| 3,591,816 | 8/1971 | Moriyoshi | 310/162 |
| 3,648,085 | 3/1972 | Fujii | 310/54 |
| 3,675,056 | 7/1972 | Lenz | 310/59 |
| 3,749,953 | 7/1973 | Baumann et al. | 310/62 |
| 3,761,748 | 9/1973 | Baumann et al. | 310/58 |
| 3,819,965 | 6/1974 | Schoenduba | 310/58 |
| 4,331,209 | 5/1982 | Bauer et al. | 310/63 |
| 4,406,959 | 9/1983 | Harano et al. | 310/58 |
| 4,465,948 | 8/1984 | Oyama et al. | 310/58 |
| 4,473,765 | 9/1984 | Butman et al. | 310/215 |
| 4,611,137 | 9/1986 | Thomas | 310/54 |
| 4,959,570 | 9/1990 | Nakmura et al. | 310/54 |
| 5,034,639 | 7/1991 | Huss et al. | 310/60 A |
| 5,189,325 | 2/1993 | Jarczynski | 310/54 |
| 5,214,325 | 5/1993 | Matson et al. | 310/58 |
| 5,218,252 | 6/1993 | Iseman et al. | 310/64 |
| 5,363,002 | 11/1994 | Hernden et al. | 310/58 |
| 5,443,130 | 8/1995 | Tanaka et al. | 180/65.6 |

FOREIGN PATENT DOCUMENTS

| | | | |
|---|---|---|---|
| 0652164 | 12/1964 | Belgium | 310/62 |
| 0664705 | 6/1965 | Belgium | 310/58 |
| 1010626 | 6/1957 | Germany | 310/59 |
| 0269378 | 6/1964 | Netherlands | 310/58 |
| 40598 | 11/1961 | Switzerland . | |
| WO8500475 | 1/1985 | WIPO | H02K 9/00 |

OTHER PUBLICATIONS

Carlo C. DiPietro, Sian S. Lie, Nagwa Elksabgy: "Electric Vehicle Motor"; *Westinghouse Motor Company*, Mar. 2, 1994.

*Primary Examiner*—Thomas M. Dougherty

[57] ABSTRACT

An electric vehicle motor and related method of cooling wherein coolant is provided to a coolant inlet of the motor housing, directed through a plurality of radial slots of a stator core that is encased within the housing, and exited from a coolant outlet of the motor housing. The radial slots house the stator conductor wires such that the coolant is forced to come in contact with all of the external surface of all of the stator wires.

21 Claims, 12 Drawing Sheets

ELECTRIC INDUCTION MOTOR AND RELATED METHOD OF COOLING

This application is a continuation of application Ser. No. 08/258,150 filed on Jun. 10, 1994, now abandoned.

RELATED APPLICATIONS

The following identified U.S. patent applications are filed on the same date as the instant application and are relied upon and incorporated by reference in this application.

U.S. patent application entitled "Flat Topping Concept" bearing attorney docket No. 58,295 and U.S. patent application Ser. No. 08/258,295, and filed on the same date herewith;

U.S. patent application entitled "Automotive 12 Volt System For Electric Vehicles" bearing attorney docket No. 58,333 and U.S. patent application Ser. No. 08/258,142, and filed on the same date herewith;

U.S. patent application entitled "Direct Cooled Switching Module For Electric Vehicle Propulsion System" bearing attorney docket No. 58,334 and U.S. patent application Ser. No. 08/258,027, and filed on the same date herewith;

U.S. patent application entitled "Electric Vehicle Propulsion System" bearing attorney docket No. 58,335 and U.S. patent application Ser. No. 08/258,301, and filed on the same date herewith;

U.S. patent application entitled "Speed Control and Bootstrap Technique For High Voltage Motor Control" bearing attorney docket No. 58,336 and U.S. patent application Ser. No. 08/258,294, and filed on the same date herewith;

U.S. patent application entitled "Vector Control Board For An Electric Vehicle Propulsion System Motor Controller" bearing attorney docket No. 58,337 and U.S. patent application Ser. No. 08/258,306, and filed on the same date herewith;

U.S. patent application entitled "Digital Pulse Width Modulator With Integrated Test And Control" bearing attorney docket No. 58,338 and U.S. patent application Ser. No. 08/258,305, and filed on the same date herewith;

U.S. patent application entitled "Control Mechanism For Electric Vehicle" bearing attorney docket No. 58,339 and U.S. patent application Ser. No. 08/258,149, and filed on the same date herewith;

U.S. patent application entitled "Improved EMI Filter Topology for Power Inverters" bearing attorney docket No. 58,340 and U.S. patent application Ser. No. 08/258,153, and filed on the same date herewith;

U.S. patent application entitled "Fault Detection Circuit For Sensing Leakage Currents Between Power Source And Chassis" bearing attorney docket No. 58,341 and U.S. patent application Ser. No. 08/258,179, and filed on the same date herewith;

U.S. patent application entitled "Electric Vehicle Relay Assembly" bearing attorney docket No. 58,342 and U.S. patent application Ser. No. 08/258,117, and filed on the same date herewith;

U.S. patent application entitled "Three Phase Power Bridge Assembly" bearing attorney docket No. 58,343 and U.S. patent application Ser. No. 08/258,033, and filed on the same date herewith;

U.S. patent application entitled "Electric Vehicle Propulsion System Power Bridge With Built-In Test" bearing attorney docket No. 58,344 and U.S. patent application Ser. No. 08/258,034, and filed on the same date herewith;

U.S. patent application entitled "Method For Testing A Power Bridge For An Electric Vehicle Propulsion System" bearing attorney docket No. 58,345 and U.S. patent application Ser. No. 08/258,178, and filed on the same date herewith;

U.S. patent application entitled "Electric Vehicle Power Distribution Module" bearing attorney docket No. 58,346 and U.S. patent application Ser. No. 08/258,157, and filed on the same date herewith;

U.S. patent application entitled "Electric Vehicle Chassis Controller" bearing attorney docket No. 58,347 and U.S. patent application Ser. No. 08/258,628, and filed on the same date herewith;

U.S. patent application entitled "Electric Vehicle System Control Unit Housing" bearing attorney docket No. 58,348 and U.S. patent application Ser. No. 08/258,156, and filed on the same date herewith;

U.S. patent application entitled "Low Cost Fluid Cooled Housing For Electric Vehicle System Control Unit" bearing attorney docket No. 58,349 and U.S. patent application Ser. No. 08/258,299, and filed on the same date herewith;

U.S. patent application entitled "Electric Vehicle Coolant Pump Assembly" bearing attorney docket No. 58,350 and U.S. patent application Ser. No. 08/258,296, and filed on the same date herewith;

U.S. patent application entitled "Heat Dissipating Transformer Coil" bearing attorney docket No. 58,351 and U.S. patent application Ser. No. 08/258,141, and filed on the same date herewith;

U.S. patent application entitled "Electric Vehicle Battery Charger" bearing attorney docket No. 58,352 and U.S. patent application Ser. No. 08/258,154, and filed on the same date herewith.

BACKGROUND OF THE INVENTION

1. Field of the Invention

The present invention relates to electric induction motors. More particularly, the invention relates to electric induction motors and related methods of cooling. While the invention is subject to a wide range of applications, it is especially suitable for use in an electric vehicle propulsion system; and will be particularly described in that connection.

2. Description of the Related Art

Conventional electric motors, and, in particular, squirrel cage induction motors, generally consist of a stator and a rotor. Both the stator and rotor are comprised of a core of magnetic laminations containing conductors typically made of copper. The stator also includes conductive end turns at each end of its core, while the rotor includes conductive end caps at its ends.

Operation of the motor generates heat in the core and conductors of both the stator and rotor. In order to avoid overheating and failure of the motor, the stator and rotor must be cooled. According to one conventional cooling technique, a coolant, typically oil, is pumped into the motor housing. The coolant is directed to an array of spray nozzles located at each end of the motor housing. The nozzles spray the coolant at the conductive end turns of the stator and the end caps of the rotor. The coolant then drains by gravity into a motor sump, where it is pumped out of the motor, through an oil cooler, and then back to the spray nozzles.

According to this technique, the coolant contacts only the conductive end turns and end caps of the stator and rotor respectively. The conductors, especially those in the stator core, are the main sources of heat within the motor. Heat generated in these conductors must travel by conduction from the center to the ends of the stator. At the high power levels typically encountered in electric vehicle applications, this cooling technique may not sufficiently cool the motor, resulting in motor failure.

SUMMARY OF THE INVENTION

Accordingly, the present invention is directed to an electric vehicle motor and related method of cooling that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof, as well as the appended drawings.

To achieve these and other advantages and in accordance with the purpose of the invention, as embodied and broadly described herein, the invention provides an electric vehicle motor including a housing having a pair of end bells, a coolant inlet, and a coolant outlet. The motor further includes a stator core encased within the housing. The stator core has opposite ends between the end bells, a plurality of radial slots extending axially between the opposite ends of the stator core, conductive windings within the slots, and conductive end turns extending from the slots. The motor according to the present invention further includes a coolant path beginning at the coolant inlet, proceeding through the slots of the stator core, and ending at the coolant outlet.

In another aspect of the present invention, the above electric vehicle motor further includes a second coolant inlet in the housing. A rotor having opposite end caps is disposed within the stator core. A second coolant path begins at the second coolant inlet, proceeds to the end caps, and ends at the coolant outlet.

In still another aspect of the present invention, the invention provides an electric motor including a housing having a pair of end bells, a coolant inlet, and a coolant outlet. A stator core is encased within the housing and has opposite ends between the end bells. The stator core also includes a plurality of radial slots extending axially between the opposite ends of the stator core, conductive windings within the slots, and conductive end turns extending from the slots. The electric motor further includes at least one shroud disposed within the housing for directing coolant through the slots and towards the coolant outlet. Each of the at least one shroud extends from one of the opposite ends of the stator core to a corresponding one of the end bells.

In a further aspect of the present invention, there is provided a method of cooling an electric vehicle motor including the step of providing coolant to a coolant inlet of a motor housing, wherein the motor housing has a pair of end bells. The method further includes directing the coolant through a plurality of radial slots of a stator core. The stator core is encased within the housing and has opposite ends between the end bells and conductive end turns extending from the slots. The slots extend axially between the opposite ends of the stator core and contain conductive windings. The method further includes discharging the coolant from a coolant outlet of the housing.

In a still further aspect, the above method of cooling an electric vehicle motor further includes providing coolant to a second coolant inlet of the motor housing. The end caps of a rotor are then sprayed with the coolant provided at the second coolant inlet. The coolant discharges at the coolant outlet.

It is to be understood that the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate preferred embodiments of the invention, and, together with a description, serve to explain the principles of the invention.

DESCRIPTION OF THE PREFERRED EMBODIMENTS

Figure 1:
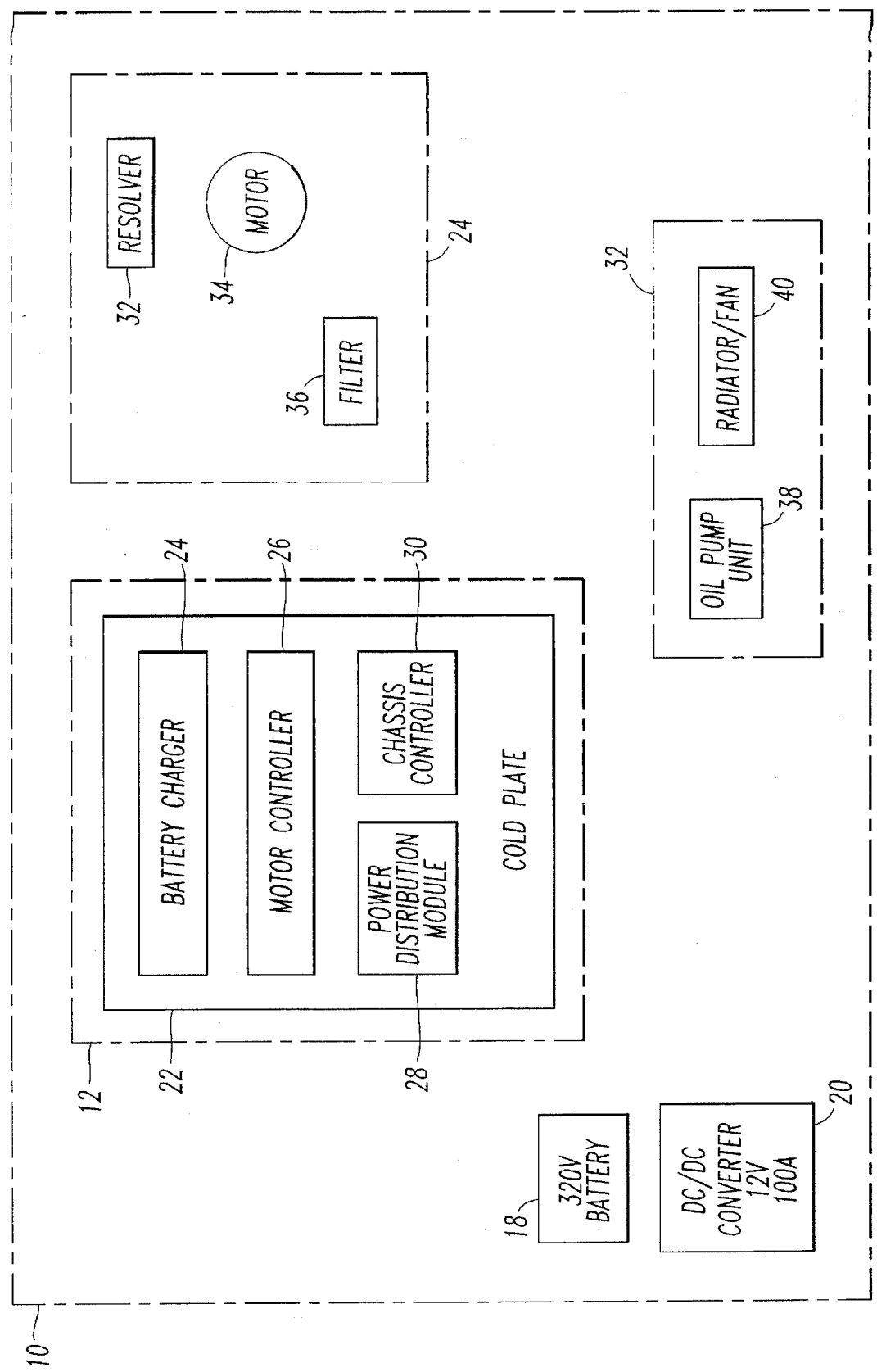
FIG. 1 is a block diagram of an electric vehicle propulsion system in which a motor and related method of cooling according to the present invention are used.

Reference will be made in detail to the present preferred embodiments of the invention, examples of which are illustrated in the accompanying drawings. Like reference numerals refer to like parts in the various Figures of the drawings.

The present invention, which relates to an electric induction motor and related method of cooling, will be discussed with respect to an electric vehicle propulsion system 10 as shown in FIG. 1. The electric vehicle propulsion system 10 comprises a system control unit 12, a motor assembly 14, a cooling system 16, a battery 18, and a DC/DC converter 20. The system control unit 12 includes a hollow cold plate 22. The major heat-generating electrical components are a battery charger 24 and motor controller 26. Other components in the system control unit include a power distribution module 28 and chassis controller 30. These components are mounted in thermal contact with the cold plate. The cooling system 16 includes an oil pump unit 38 which pumps coolant through the cold plate 22, the motor 34, and a radiator/fan 40. The motor assembly 14 includes a resolver 32, the motor 34, and a filter 36.

The motor 34 preferably is a 3-phase AC induction motor having one or more, electrically isolated 3-phase windings capable of producing high torque at low speed to provide performance comparable to conventional gas-driven engines. The rotor of the motor 34 is coupled to the vehicle transaxle. Preferably, the separate windings in each slot of the stator 34 are aligned substantially on top of one another such that the current in each conductor contributes to the torque of the motor. In this way, separate electrically independent 3-phase power bridges can be used to drive the same motor.

The resolver 32 is positioned proximate to the motor 34 for detecting the rotational speed of the motor shaft and for providing signals indicative of the speed of the motor shaft to the motor controller 26. The resolver 32 can comprise a commercially available resolver or other resolver known in the art. Reference signals for the resolver 32 are provided by the motor controller 26.

Figure 2:
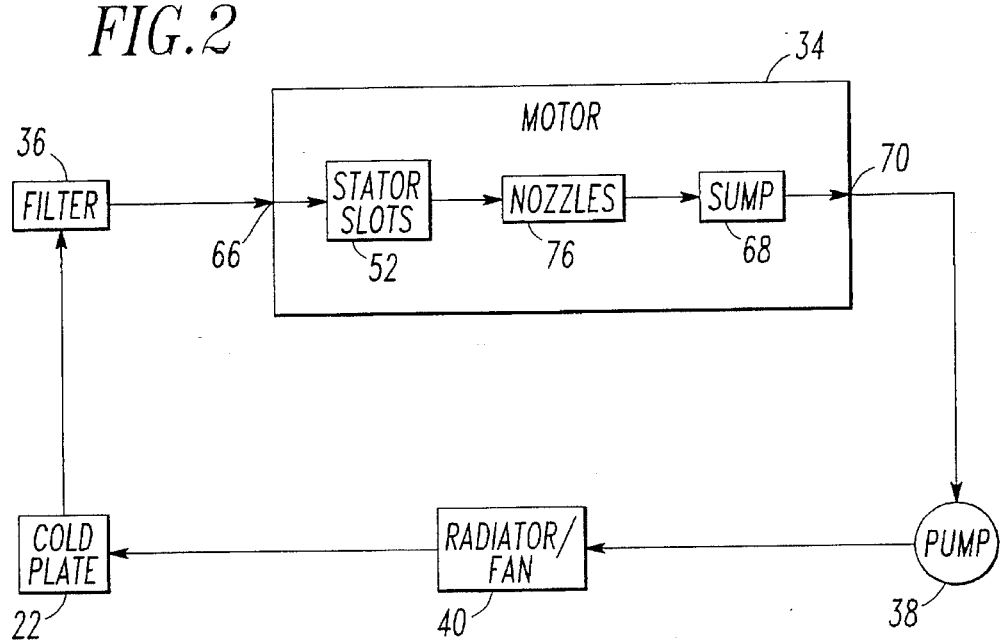
FIG. 2 is a block diagram showing a coolant flow system according to a first embodiment of the present invention.

FIG. 2 diagrams a closed loop coolant flow system according to a first embodiment of the present invention. As shown, the coolant (preferably comprising synthetic high temperature, low viscosity oil) flows generally through the pump unit 38, radiator/fan 40, cold plate 22, filter 36, and in series through the motor 34. Heat is removed from the coolant by the radiator/fan 40 and the coolant is filtered by the filter 36, which can comprise a commercially available oil filter known in the art. The speed of the pump 38 controls the volumetric flow rate of coolant to the motor 34.

Figure 3:
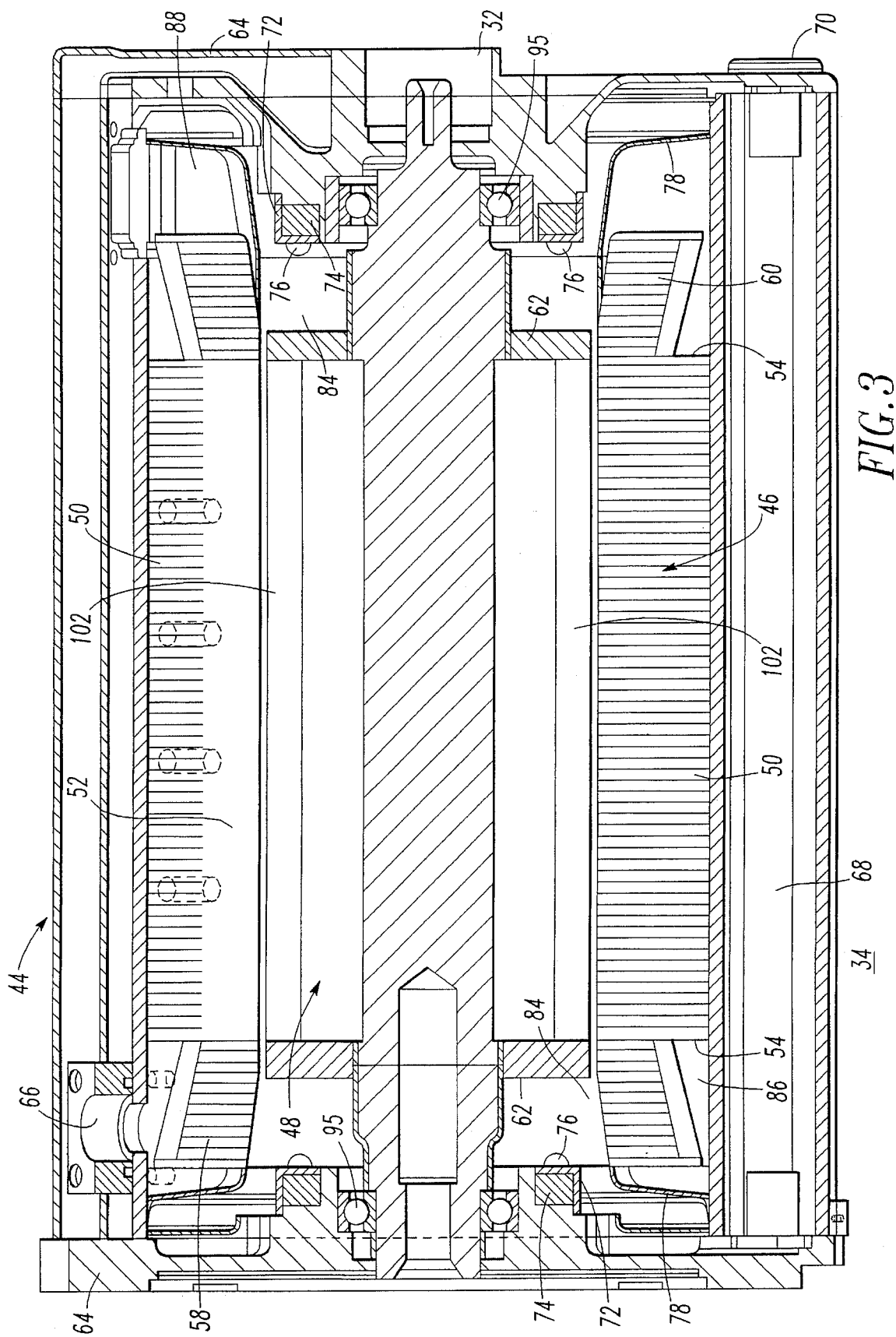
FIG. 3 is a cross-sectional view of a motor, as seen on line C—C of the motor housing shown in FIG. 6, according to a first embodiment of the present invention.
Figure 4:
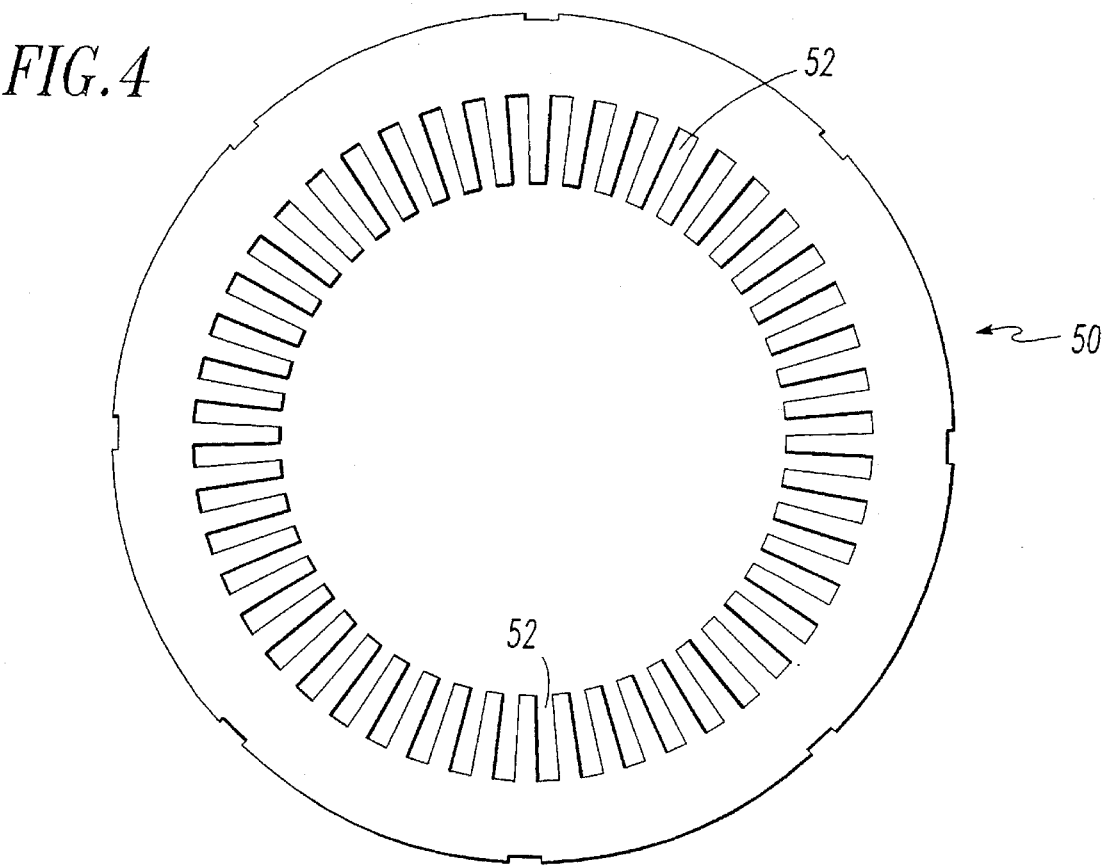
FIG. 4 is an end view of a stator lamination used to form the stator core of the motor according to the present invention.
Figure 5:
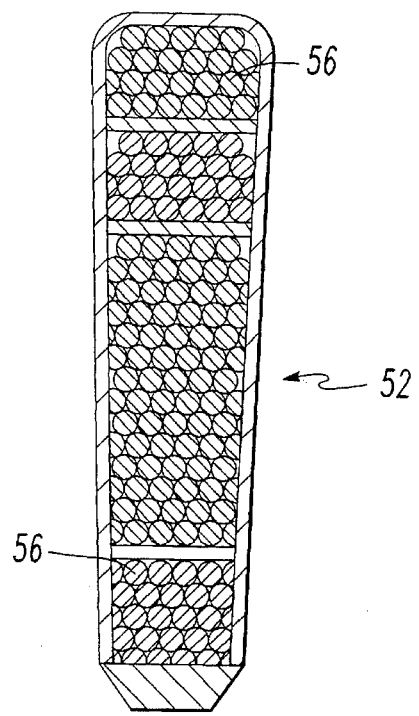
FIG. 5 is an end view of a stator slot containing conductive windings in accordance with the present invention.

The motor 34 includes a housing 44, a stator core 46, and a rotor 48, as shown in FIG. 3. The rotor 48 is preferably comprised of a steel shaft, iron laminations, copper squirrel cage conductors and copper end conductors which connect all of the copper rotor conductors at each end of the rotor. As is conventional, the stator core 46 consists of a stack of stator laminations 50, preferably comprised of the same thickness of iron laminations used in the rotor, and copper wires wound into the slots. As shown most clearly in FIG. 4, each stator lamination 50 includes a plurality of peripherally spaced slots 52. When the laminations 50 are stacked together to form the stator core 46, the slots 52 extend axially to opposite ends 54 of the stator core 46. Each stator slot 52 contains conductive windings 56 that are preferably round wires, as depicted in FIG. 5. Alternatively, the windings 56 may be of other shapes known in the art and are preferably composed of copper. The conductive windings 56 are wound about the stator core 46 to extend from the stator slots 52 and form exposed conductive end turns 58 and 60. The end turns 58 and 60 protrude from both ends 54 of the stator core 46.

Figure 16:
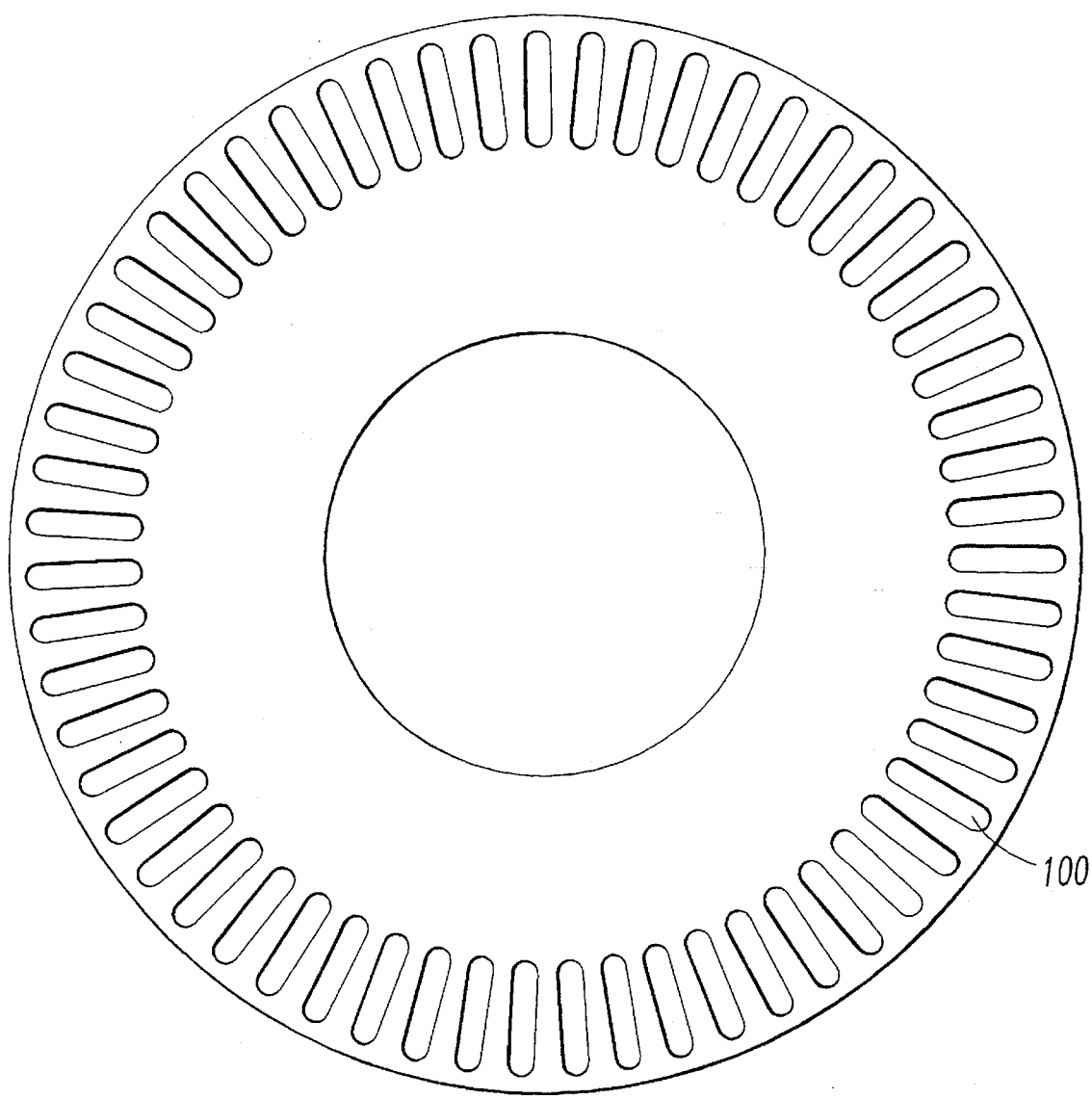
FIG. 16 is an end view of a rotor lamination used to form the rotor of the motor according to the present invention.

The rotor 48 is disposed within the stator core 46 and includes end caps 62. Between the end caps are a plurality of thin sheet metal laminations as shown in FIG. 16. These laminations have holes or slots 100, which are in alignment with one another. These slots 100 are filled with copper conductors 102 (FIG. 3) which extend from one end 62 to the other and are electrically and mechanically joined to the end caps 62. Preferably, the end caps 62 and the squirrel cage conductors 102 are composed of copper.

Figure 6:
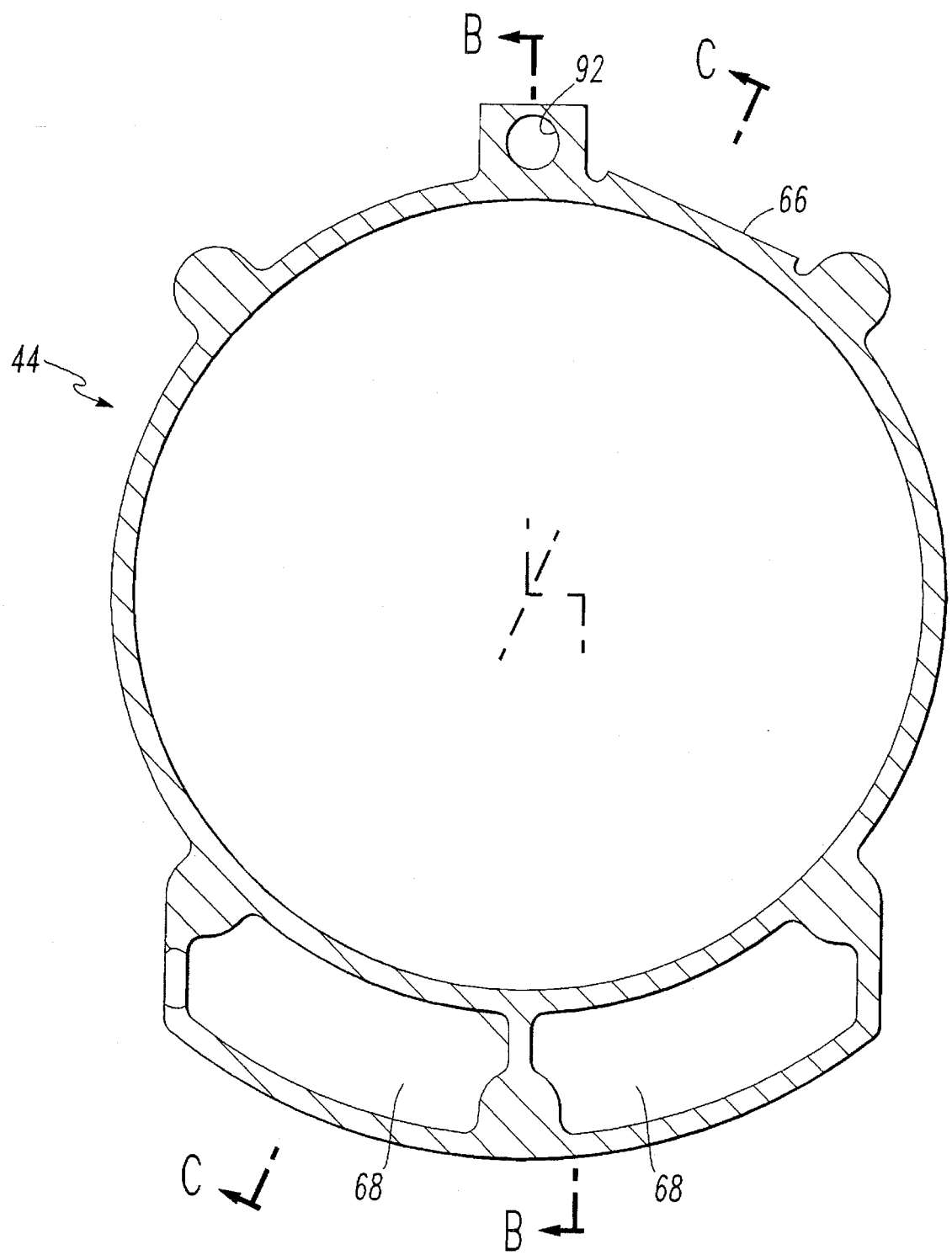
FIG. 6 is a cross-sectional end view of a motor housing according to the present invention.

The housing 44, an end view of which is shown in FIG. 6, encases the stator core 46 between the end bells 64. The housing 44 includes a coolant inlet 66, a coolant sump 68, and a coolant outlet 70 (shown in FIG. 3) adjacent the coolant sump 68.

As shown in FIG. 3, a coolant nozzle ring enclosing an annular chamber 74 is affixed to each end bell 64. At least one spray nozzle 76 is mounted upon each nozzle ring 72 for directing a spray of coolant towards the rotor end caps 62. Preferably, four equally spaced nozzles 76 are mounted upon each nozzle ring 72 in order to spray a large area of the rotor end caps 62 as the rotor 48 rotates.

Figure 8:
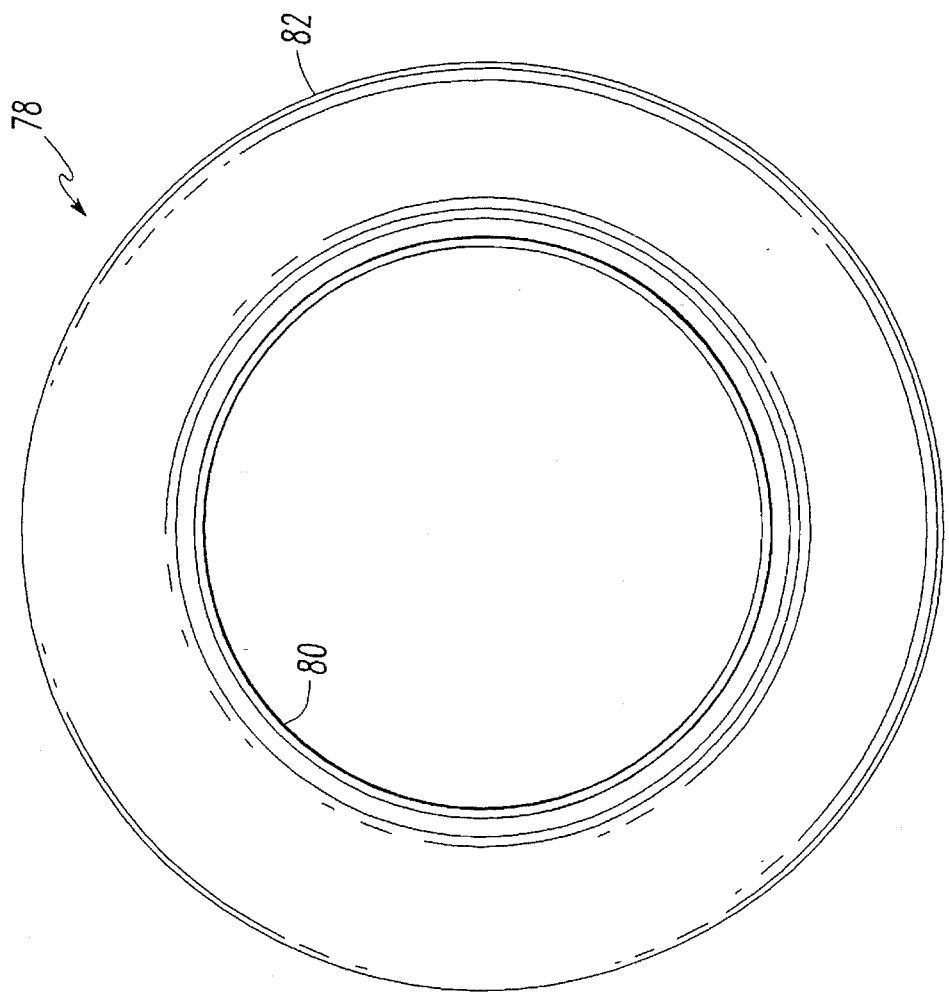
FIG. 8 is an end view of the shroud shown in FIG. 7.
Figure 7:
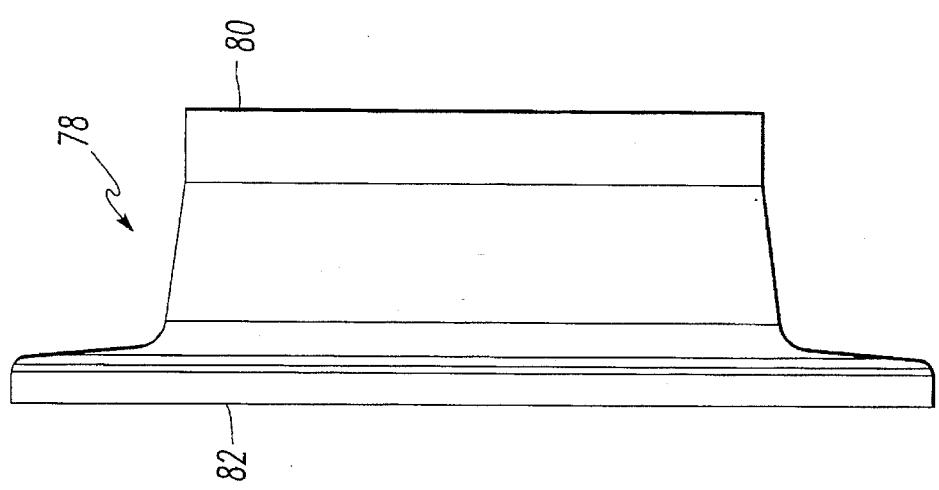
FIG. 7 is a side view of a shroud that is used in the motor according to the present invention.

The electric motor 34, according to the first embodiment, further includes a pair of shrouds 78 enclosed within the housing 44. As shown in FIGS. 7 and 8, each shroud 78 is substantially bell-shaped, with an inner diameter at a throat 80 and an outer diameter at a mouth 82. The shrouds 78 extend to the end bells 64 from the opposite ends 54 of the stator core 46, as shown in FIG. 3. The end bells 64, which are bolted to the housing 44, hold the shrouds 78 firmly against the stator core 46. The shrouds 78 may be held in place by any other known means. The throat 80 of each shroud 78 contacts the inner diameter of the end laminations 50 of the stator core 46. The shrouds 78 effectively define inner annular chambers 84 and outer annular chambers 86 and 88.

Figure 9:
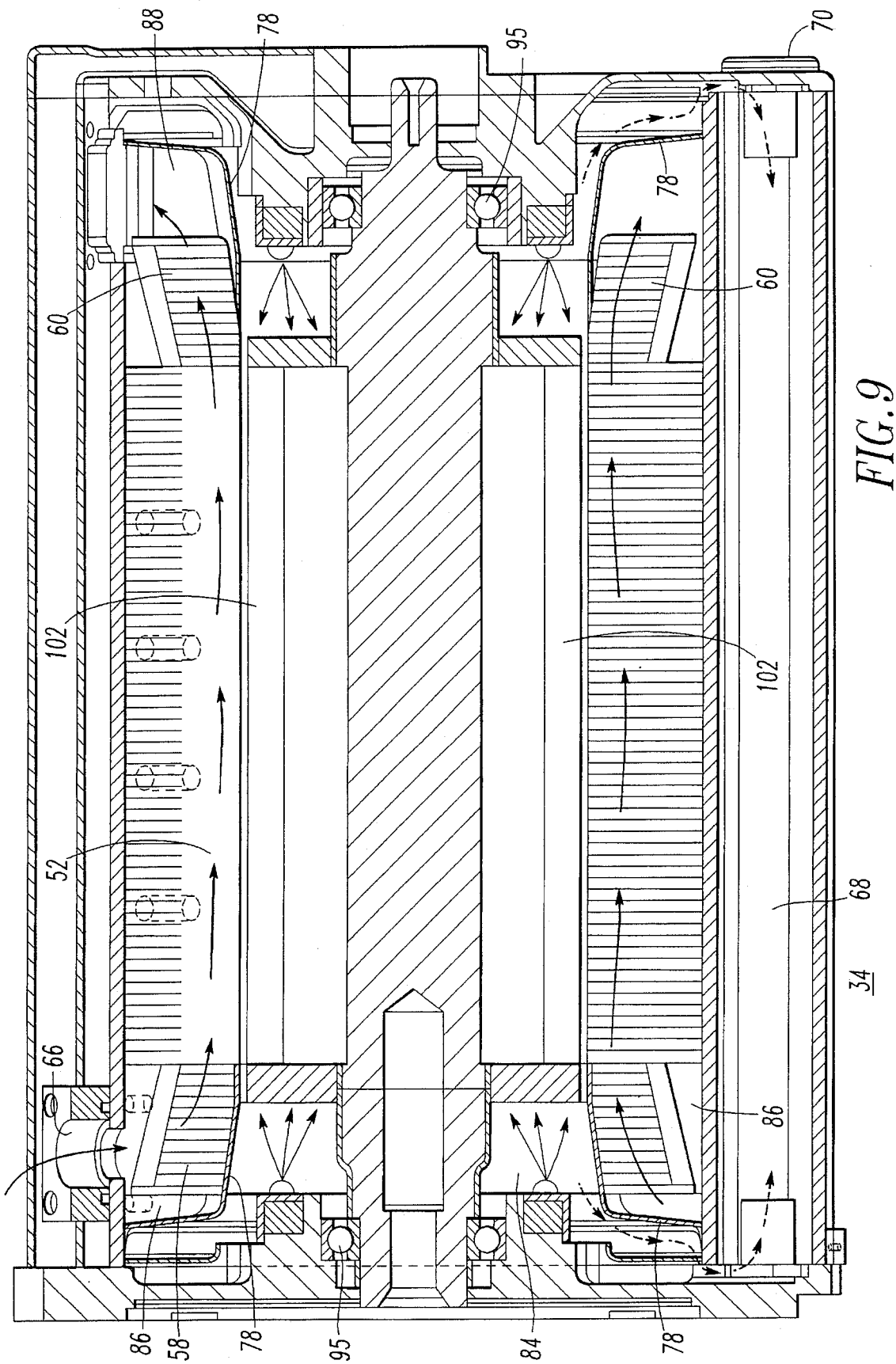
FIG. 9 is a cross-sectional view of the motor similar to FIG. 3, indicating the coolant flow path according to the first embodiment of the present invention.

According to the first embodiment, a coolant passes through the stator slots 52, nozzles 76, and sump 68 in a series flow arrangement. In operation, the coolant, preferably oil, after cooling by the radiator/fan 40 and passage through the cold plate 22 and the filter 36, enters the electric motor 34 at the inlet 66, as shown in FIG. 9. The speed of the pump 38 controls the volumetric flow rate of the coolant entering the inlet 66. The coolant contacts and cools the conductive end turns 58 as it fills the outer annular chamber 86. The shroud 78 defining chamber 86 then directs the coolant into the stator slots 52, filling the spacing between the conductive windings 56. The coolant contacts virtually all of the conductive windings 56, cooling the windings 56 and the stator core 46.

Figure 10:
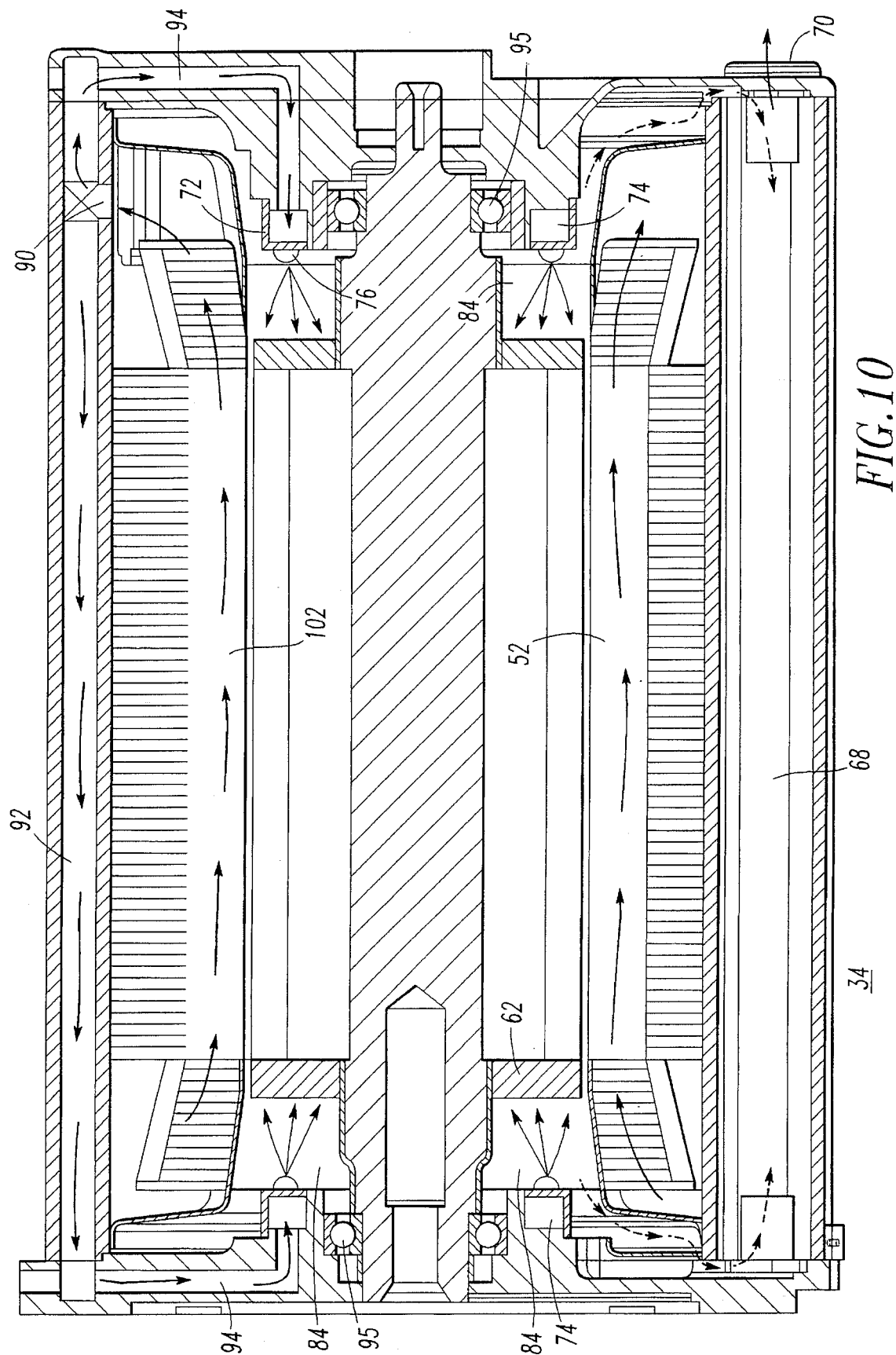
FIG. 10 is a cross-sectional view of the motor, as seen on line B—B of the motor housing as shown in FIG. 6, further indicating the coolant flow path according to the first embodiment of the present invention.

After the coolant passes through the slots 52, it then contacts and cools the conductive end turns 60 as it fills the outer annular chamber 88. The shroud 78 defining the chamber 88 next directs the coolant through an opening 90 and into a passageway 92 in the upper portion of the housing 44, as shown in FIG. 10. The passageway 92 guides the coolant towards passageways 94 in the end bells 64 and ultimately to the chambers 74 defined by each nozzle ring 72. The nozzles 76 spray the coolant into the annular chambers 84 towards the end caps 62 of the rotor 48, as shown in FIGS. 9 and 10. Heat generated in the rotor 48 conducts to the end caps 62, which are cooled by the coolant spray emitted by the nozzles 76.

After contacting the end caps 62, the coolant in the annular chambers 84 travels to the coolant sump 68 past the end bells 64, as shown by the dashed arrows in FIGS. 9 and 10. The coolant pump unit 38 (FIG. 2) then pumps the coolant from the coolant sump 68 back to the radiator/fan 40 through the coolant outlet 70. The coolant not only cools the motor stator and rotor but also serves to lubricate the motor bearings 95.

Figure 11:
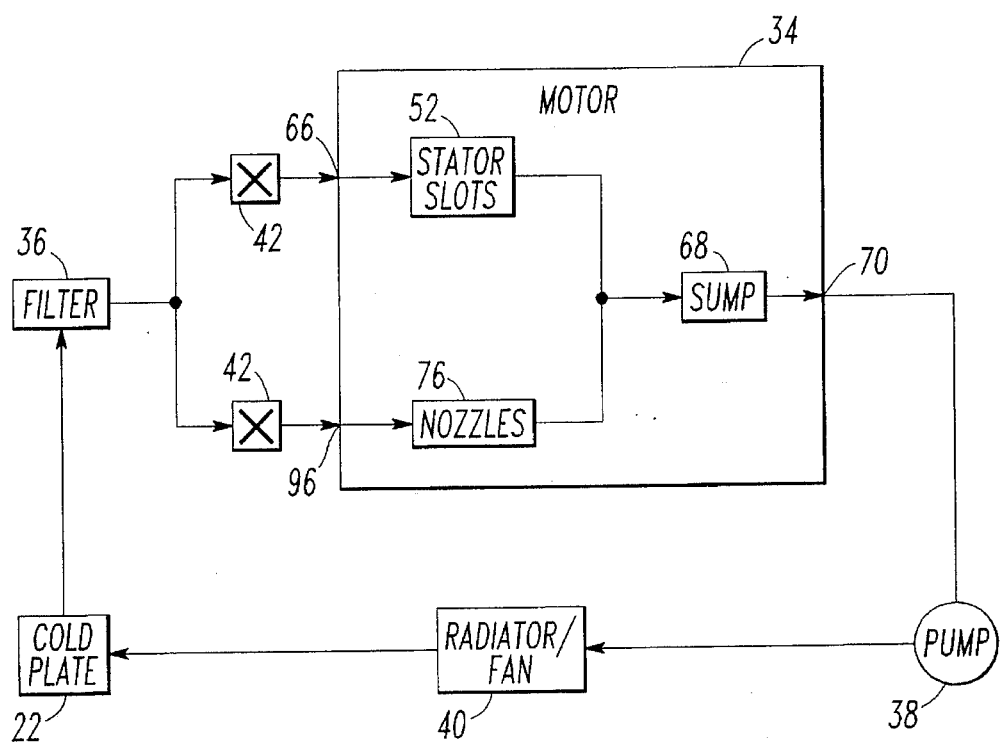
FIG. 11 is a block diagram showing a coolant flow system according to a second embodiment of the present invention.
Figure 12:
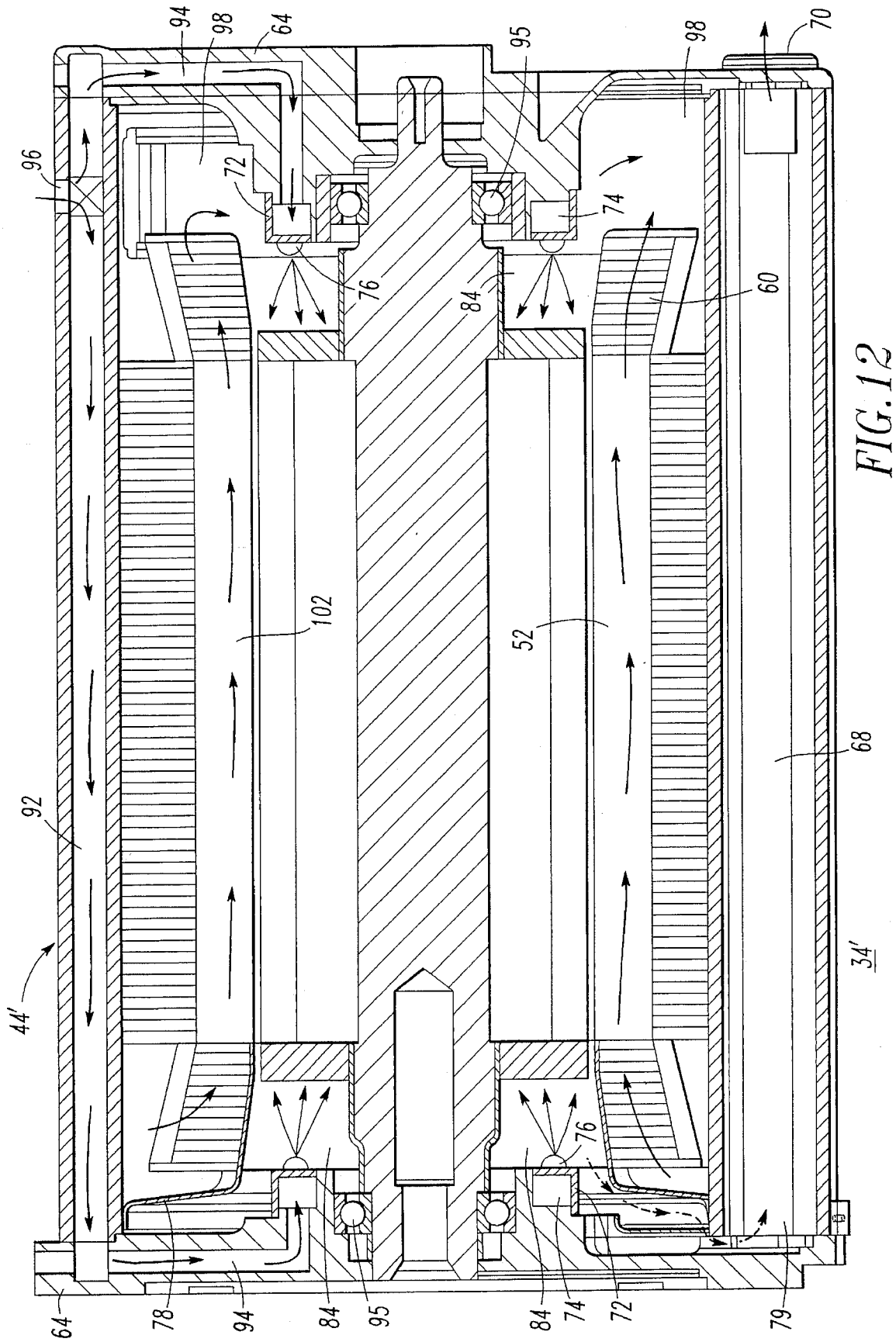
FIG. 12 is a cross-sectional view of a motor, as seen on line B—B of the motor housing shown in FIG. 6, showing the coolant flow path according to the second embodiment of the present invention.

FIG. 11 shows an electric vehicle coolant flow system including an electric vehicle motor 34' according to a second embodiment of the present invention. In this second embodiment, the coolant path is characterized by parallel flow through the motor 34'. As shown in FIG. 12, a housing 44' includes, in addition to the coolant inlet 66, a second coolant inlet 96. The coolant flowing from the filter 36 splits into two separate lines, each with a valve 42 to control the volumetric flow rate of the coolant to each coolant inlet 66 and 96.

Figure 13:
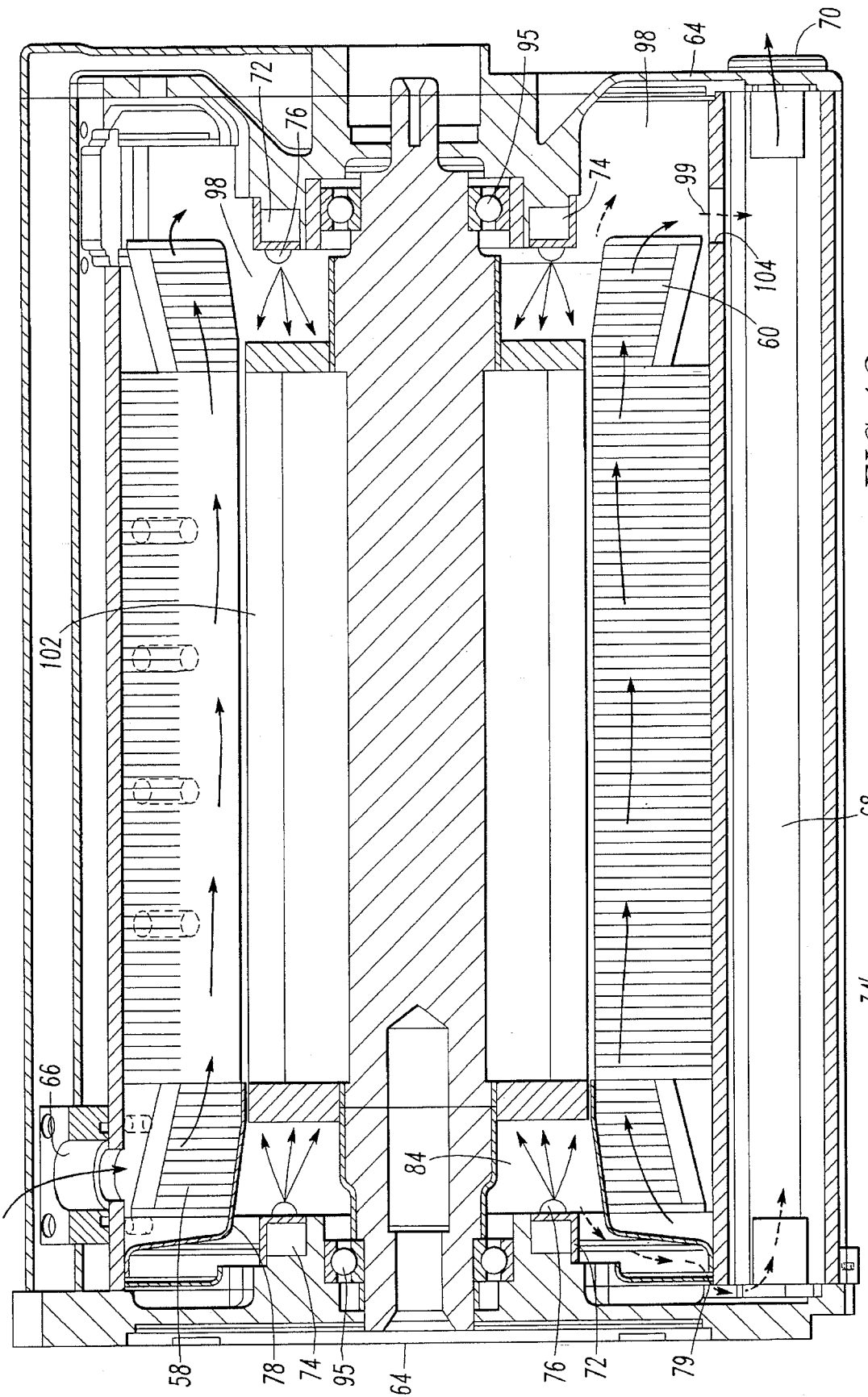
FIG. 13 is a cross-sectional view of a motor, as seen on line C—C of the motor housing shown in FIG. 6, further showing the coolant flow path according to the second embodiment of the present invention.

As shown in FIG. 13, the coolant flow to the inlet 66 is directed into and through the stator slots 52 as in the first embodiment. The shroud 78 that is placed proximate the inlet 66 directs the coolant into the stator slots 52.

Unlike the first embodiment however, a second shroud 78 is not present within the housing 44' at the end 54 of the stator core 46 at which the coolant exits the stator slots 52. Therefore, at this end 54, there is a single chamber 98 that is effectively the combination of annular chambers 84 and 88 of the first embodiment. After exiting the stator slots 52, the coolant fills this chamber 98 and contacts and cools the end turns 60. However, it is not essential that the oil make complete and thorough contact with the end turns 60 because heat that is generated in them will travel by conduction into the stator slots 52 where the oil cooling of the wires 56 is more effective. The coolant then travels to the coolant sump 68 through a hole or slot 104 proximate the conductive end turns 60, as shown by the dashed arrow 99 in FIG. 13.

Coolant entering the second coolant inlet 96 flows into the passageway 92, as shown in FIG. 12. The passageway 92 guides the coolant towards the passageways 94 in the end bells 64 and ultimately to the chambers 74 defined by each nozzle ring 72. As in the first embodiment, nozzles 76 spray coolant towards the end caps 62 of the rotor 48.

After contacting and cooling the end caps 62, the coolant in the annular chamber 84 is guided to the coolant sump 68 by the shroud 78, as shown by dashed arrow 79. The coolant in the chamber 98 travels into the coolant sump 68 with the coolant that passed through the stator slots 52, as indicated by dashed arrow 99. The coolant pump unit 38 then pumps the coolant from the sump 68 back to the radiator/fan 40 through the coolant outlet 70.

Figure 14:
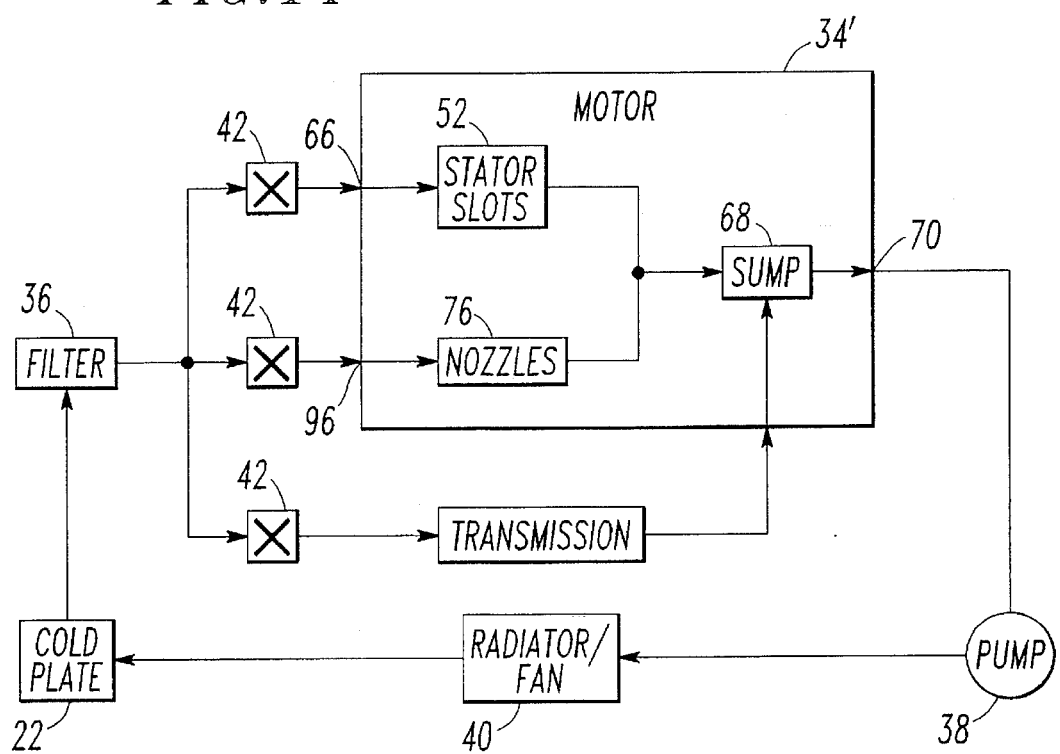
FIG. 14 is a block diagram showing a coolant flow system according to a third embodiment of the present invention.

FIG. 14 shows an electric vehicle coolant flow system according to a third embodiment of the present invention. In this third embodiment, coolant flowing from the filter 36 splits into three separate lines, two leading to the motor 34' and the third leading to a separate device requiring cooling, such as a transmission. Valves 42 within each line control the volumetric flow rates to the coolant inlets 66 and 96 of the motor 34' and to the transmission.

The coolant flow in the motor 34' according to the third embodiment is characterized by the same parallel flow as that of the second embodiment. The coolant entering and cooling the transmission flows into the coolant sump 68 of the motor 34', where all of the coolant is pumped back to the radiator/fan 40.

Figure 15:
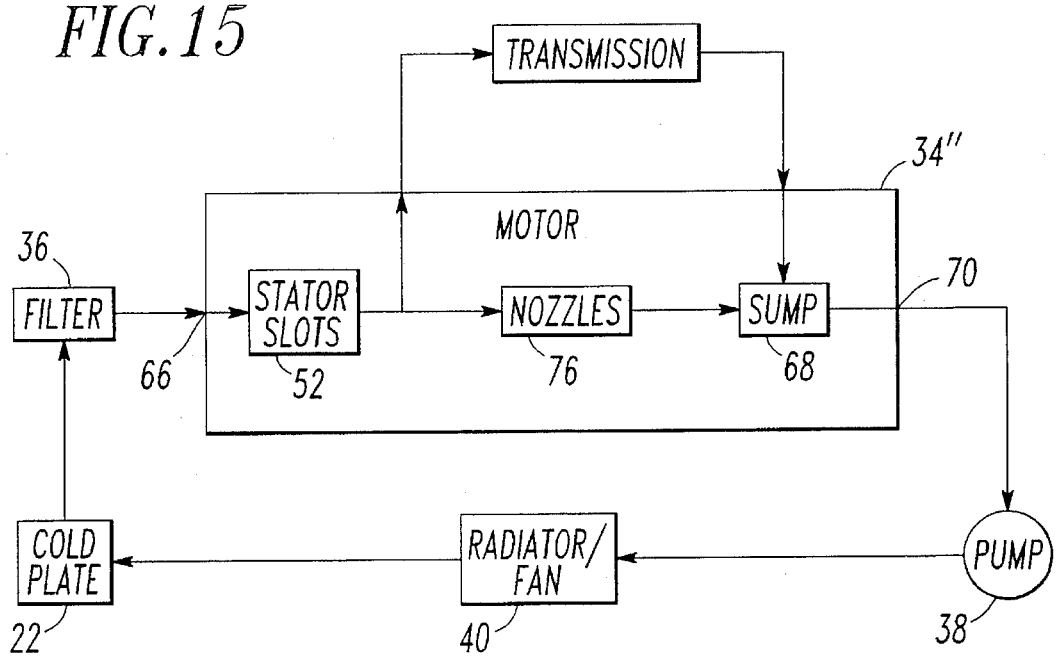
FIG. 15 is a block diagram showing a coolant flow system according to a fourth embodiment of the present invention.

FIG. 15 shows an electric vehicle coolant flow system according to a fourth embodiment of the invention. In this fourth embodiment, coolant flowing from the filter 36 enters a motor 34" through the inlet 66. The coolant path through the motor 34" is characterized by the series flow arrangement in the first embodiment. However, unlike the first embodiment, a portion of the coolant exiting the stator slots 52 and entering passageway 92 is directed to a device outside of the motor 34" and requiring cooling, such as the transmission. This can be accomplished by running a line from a hole in the passageway 92 to the transmission. The coolant exiting the transmission returns to the motor 34", entering the coolant sump 68, at which point all of the coolant is pumped back to the radiator/fan 40 by the pump unit 38.

The method of cooling the motor according to the present invention brings the coolant into direct contact with the main source of heat in the motor while also lubricating the motor. The stator core and, in particular, the conductive windings within the stator slots generate a major portion of the heat within the motor, typically about two thirds. The rest of the heat is generated in the rotor and by small amounts of friction and windage. By passing the coolant through the stator slots and in contact with the conductive windings, the motor can sustain the higher power levels characteristic of electric vehicle applications without overheating. This enables a smaller, lighter, and less expensive motor for given power requirements.

It will be apparent to those skilled in the art that various modifications and variations can be made in the electric motor and related method of cooling of the present invention without departing from the spirit or scope of the invention. Thus, it is intended that the present invention cover the modifications and variations of this invention provided they come within the scope of the appended claims and their equivalents.

I claim:

1. An electric vehicle motor having a rotor, a stator core, and an air gap therebetween, comprising:

a motor housing including a pair of end bells, a coolant inlet, and a coolant outlet for a liquid coolant;

said stator core being encased within the housing, the stator core having opposite ends between the end bells, a plurality of radial slots extending axially between the opposite ends, conductive stator windings located within and supported by the slots, and conductive end turns of the stator windings extending from the slots;

a restricted coolant path for the liquid coolant through the stator core, beginning at the coolant inlet and proceeding entirely through the slots in an axial direction from one end of the stator core to the other so that said coolant comes in direct contact with substantially all of the external surface of the conductive windings along their entire length as well as the end turns thereof, and ending at the coolant outlet; and means for directing the liquid coolant into and through the slots and filling the spacing between the conductive windings while preventing the liquid coolant from entering the air gap.

2. The electric vehicle motor according to claim 1, wherein said means for directing the liquid coolant comprises a pair of shrouds disposed within the housing for directing coolant into and through the slots and towards the coolant outlet, each of the pair of shrouds extending from one of the opposite ends of the stator core to a corresponding one of the end bells.

3. The electric vehicle motor according to claim 2, wherein each of the pair of shrouds is substantially bell-shaped and comprises a mouth adjacent to one of the end bells.

4. The electric vehicle motor according to claim 1, wherein said rotor is disposed within the stator core and includes opposite end caps, and additionally including means in the coolant path for directing the liquid coolant to the end caps.

5. The electric vehicle motor according to claim 4, wherein said means for directing the liquid coolant to the end caps comprises at least one nozzle affixed to each end bell for directing a spray of said liquid coolant towards the end caps.

6. The electric vehicle motor according to claim 1, wherein said means for directing the liquid coolant comprises at least one shroud disposed within the housing for directing coolant from said coolant inlet into one end of the slots of the stator core, the shroud extending from immediately adjacent said one end of the stator core to a corresponding end bell of said pair of end bells.

7. The electric vehicle motor according to claim 6, further comprising:
   a second coolant inlet in the housing;
   said rotor being disposed within the stator core and including a pair of end caps thereon; and
   a second coolant path for the liquid coolant beginning at the second coolant inlet, proceeding to the end caps, and ending at the coolant outlet.

8. The electric vehicle motor according to claim 7, wherein the second coolant path includes at least one nozzle affixed to each end bell for directing a spray of the liquid coolant towards the pair of end caps.

9. The electric vehicle motor according to claim 4, and additionally including means for directing a portion of the liquid coolant from said coolant path towards a device external to the electric vehicle motor and requiring cooling thereby and wherein the means for directing the liquid coolant towards said device is located along the liquid coolant path upstream from a portion of the coolant contacting the end caps.

10. An electric motor having a rotor, a stator core and an air gap therebetween, comprising:
    a housing including a pair of end bells, a liquid coolant inlet, and a liquid coolant outlet;
    a stator core encased within the housing, the stator core having opposite ends between the end bells, a plurality of radial slots extending axially between the opposite ends, conductive stator windings located within the slots, and conductive end turns of the stator windings extending from the slots;
    a rotor disposed within said stator core and having opposite end caps;
    at least one shroud disposed within the housing for directing liquid coolant to and through the entire length of slots so that the liquid coolant comes in direct contact with substantially all of the external surface of said conductive windings for their entire length and towards the coolant outlet while preventing the liquid coolant from entering the air gap,
    said, at least one shroud extending from immediately adjacent one of opposite ends of the stator core to a corresponding one of the end bells so as to provide a restricted coolant path; and
    means for directing the coolant to the end caps.

11. A method of cooling an electric vehicle motor including a rotor, a stator core and an air gap between the rotor and stator core, comprising the steps of:
    providing liquid coolant to a coolant inlet of a motor housing, the motor housing having a pair of end bells;
    directing the liquid coolant along a restricted coolant path to and through the entire length of a plurality of radial slots of the stator core and to end caps located on opposite ends of the rotor while preventing the liquid coolant from entering the air gap, and wherein the slots extend axially between the opposite ends of the stator core and contain conductive windings therein in direct contact with the liquid coolant, said liquid coolant coming in direct contact with substantially all of the external surfaces of the conductive windings along their entire length as well as the conductive end turns; and
    discharging the coolant from a coolant outlet of the housing.

12. The method of cooling an electric vehicle motor according to claim 11, wherein the step of directing the coolant comprises the substeps of:
    feeding the liquid coolant to and from the ends of the stator core by means of a pair of shrouds, each of the pair of shrouds being disposed within the motor housing and extending from one of the opposite ends of the stator core to a corresponding one of the end bells so as to provide a restricted liquid cooling path; and
    directing the coolant from the shrouds through the slots and towards the coolant outlet.

13. The method of cooling an electric vehicle motor according to claim 12, wherein each of the pair of shrouds is substantially bell-shaped and comprises a mouth adjacent to one of the end bells.

14. The method of cooling an electric vehicle motor according to claim 13, and further including the step of feeding the liquid coolant past the conductive end turns with the coolant by means of said shrouds.

15. The method of cooling an electric vehicle motor according to claim 11, further including the step of spraying the end caps of said rotor with the liquid coolant.

16. The method of cooling an electric vehicle motor according to claim 15, wherein the step of spraying the end caps includes spraying the liquid coolant towards the end caps from at least one nozzle affixed to each of the end bells.

17. The method of cooling an electric vehicle motor according to claim 11, wherein the step of directing the liquid coolant comprises the substeps of:
    feeding the liquid coolant past a shroud disposed within the motor housing and extending from end of the stator core at which the coolant enters the slots to a corresponding end bell while preventing the liquid coolant from entering the air gap; and
    directing the liquid coolant from the shroud into one end of the slots containing the conductive stator windings.

18. The method of cooling an electric vehicle motor according to claim 17, further including the steps of:
    feeding said liquid coolant to a second coolant inlet of the motor housing;
    spraying end caps of the rotor with the coolant fed to the second coolant inlet; and
    discharging the coolant fed to the second coolant inlet from the coolant outlet.

19. The method of cooling an electric vehicle motor according to claim 18, wherein the step of spraying the end caps includes spraying the liquid coolant towards the end caps from at least one nozzle affixed to each of the end bells.

20. The method of cooling an electric vehicle motor according to claim 11, wherein the liquid coolant comprises oil.

21. The method of cooling an electric vehicle motor according to claim 11, further including the steps of:
    directing a portion of the liquid coolant through the stator core towards a device external to the electric vehicle motor and requiring cooling by said liquid coolant; and
    returning the portion of liquid coolant directed towards the device to the cooling outlet.

* * * * *